United States Patent
Kobayashi et al.

(10) Patent No.: US 6,947,149 B2
(45) Date of Patent: Sep. 20, 2005

(54) METHOD OF ASSISTING SAMPLE INCLINATION ERROR ADJUSTMENT

(75) Inventors: Fumio Kobayashi, Saitama (JP); Zongtao Ge, Saitama (JP); Kunihiko Tanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 311 days.

(21) Appl. No.: 10/435,370

(22) Filed: May 12, 2003

(65) Prior Publication Data

US 2003/0227633 A1 Dec. 11, 2003

(30) Foreign Application Priority Data

Jun. 7, 2002 (JP) ........................................ 2002-167219

(51) Int. Cl.$^7$ .............................................. G01B 9/02
(52) U.S. Cl. ......................... 356/496; 356/510; 385/52
(58) Field of Search ................................ 356/450, 496, 356/511, 512; 385/52

(56) References Cited

U.S. PATENT DOCUMENTS 6,215,555 B1 * 4/2001 Chivers ...................... 356/512

* cited by examiner

*Primary Examiner*—Andrew H. Lee
(74) *Attorney, Agent, or Firm*—Snider & Associates; Ronald R. Snider

(57) ABSTRACT

While a ferrule held by a clamping apparatus is rotated by a predetermined angle, respective interference fringe images of a spherical leading end part of the ferrule are obtained at three or more rotational positions. Respective interference fringe center positions are obtained in thus obtained three or more interference fringe images. The center position of a circle passing near each of the interference fringe center positions is calculated and defined as a measured center position. Relative distance information between the measured center position and a position corresponding to the rotational center position of the spherical leading end part of the ferrule or the relative distance information and relative directional information thereof are outputted as an inclination error adjustment value for the axis of the ferrule.

6 Claims, 8 Drawing Sheets

503:LEADING END FACE
502A:CORE
502:FIBER
502B:CLADDING
501:FERRULE

WITH APICAL ECCENTRICITY
WITHOUT INCLINATION

T:TRAJECTORY OF INTERFERENCE FRINGE CENTER
502:FIBER
CENTER POSITION OF R
502A
P:APEX POSITION OF R

WITH INCLINATION WITHOUT APICAL ECCENTRICITY

WITH INCLINATION AND APICAL ECCENTRICITY

METHOD OF ASSISTING SAMPLE INCLINATION ERROR ADJUSTMENT

RELATED APPLICATIONS

This application claims the priority of Japanese Patent Application No. 2002-167219 filed on Jun. 7, 2002, which is incorporated herein by reference.

BACKGROUND OF THE INVENTION

1. Field of the Invention

The present invention relates to a method of assisting sample inclination error adjustment for assisting the inclination error adjustment for the axis of a ferrule held by a clamping apparatus when analyzing the form of a leading end part of the ferrule or the like by using a microscopic interferometer apparatus (also known as "interferometric microscope apparatus"), for example.

2. Description of the Prior Art

Research and development of optical fibers used for optical communications have recently been well underway.

Known as an example of this kind of optical fibers is one comprising a core having an outer diameter of about 10 μm; and cladding layer, disposed at the outer periphery of the core, having an outer diameter of about 125 μm; whereas the optical fiber is further equipped with a ferrule, disposed at a connecting end thereof, for connecting the optical fiber to another optical fiber.

The ferrule is a cylindrical component for holding and securing one end of the optical fiber in each of a set of plugs constituting an optical connector for connecting optical fibers together. After an optical fiber is inserted and secured with an adhesive or the like to the center part of the outer diameter of a ferrule, the leading end of the ferrule is polished into a mirror surface, so that two optical fibers held by respective ferrules can be connected to each other when the leading end faces of the two ferrules are butted against each other.

While the leading end face of a ferrule has been known to be polished into a plane perpendicular to the optical axis or a plane obliquely intersecting the optical axis, attention has recently been directed to one whose leading end face is subjected to PC (physical contact) polishing so as to attain a convex spherical form such that the leading end face is elastically deformed by a pressure for butting the leading end faces of ferrules against each other.

For reducing the optical loss occurring when optical fibers are connected to each other, various high-precision specs have been defined by JIS. For the PC-polished ferrule, six μm-order specs such as dimensional errors in the radius of curvature of the leading end face and positional deviation errors between the apex of the spherical leading end face of the ferrule and the center of the core of the optical fiber (the center of the fiber outer form) have been defined.

There are cases where a microscopic interferometer apparatus is used for inspecting whether a produced ferrule conforms to the above-mentioned specs or not. The microscopic interferometer apparatus is configured such that interference fringes formed by interference between object light carrying phase information such as the surface form and refractive index distribution of a minute sample and reference light reflected by a predetermined reference plate are observed, and forms and changes of the interference fringes are measured and analyzed, so as to obtain the phase information of the sample.

When inspecting the produced ferrule by using such a microscopic interferometer apparatus, a clamping apparatus is disposed at a predetermined position in front of the reference plate of the microscopic interferometer apparatus, so as to hold the ferrule to be inspected.

Since the specs for the ferrule leading end face form are in the order of μm as mentioned above, however, the measurement thereof is required to be highly accurate, whereby a measurement accuracy suitable for the inspection is hard to attain even when the ferrule held by the clamping apparatus inclines slightly. When inspecting the above-mentioned positional deviation errors between the apex of the spherical leading end face of the ferrule and the center of the core of the optical fiber (the center of the fiber outer form) in particular, a measurement accuracy suitable for the inspection is hard to attain unless the inclination error between the normal of the reference surface of the microscopic interferometer apparatus and the ferrule axis has an angle of 10 seconds or less.

The inclination error is largely attributed to cumulative errors of plug position adjusting means, plug inclination adjusting means, and the like, whereby it is practically quite difficult for the inclination error to become an angle of 10 seconds or less in the initially set state.

Though the inclination of the clamping apparatus may be adjusted while directly measuring the inclination of the ferrule, the measurement and adjustment are quite complicated and require a high accuracy, whereby the inclination error is hard to adjust.

SUMMARY OF THE INVENTION

In view of such circumstances, it is an object of the present invention to provide a method of assisting sample inclination error adjustment, which can adjust the inclination error of the axis of a ferrule held by a clamping apparatus in a simple manner at a low cost.

The present invention provides a method of assisting sample inclination error adjustment for assisting inclination error adjustment of an axis of a ferrule when a curved leading end face of the ferrule as a sample held by a clamping apparatus is observed by an interferometer apparatus, the method comprising the steps of:

causing the interferometer apparatus to obtain respective interference fringe images of the curved leading end face of the ferrule at three or more rotational positions by rotating the ferrule by a predetermined angle with respect to the clamping apparatus while in a state where the ferrule is held by the clamping apparatus;

determining respective interference fringe center positions in thus obtained at least three interference fringe images;

calculating a center position of a circle passing near each of thus determined interference fringe center positions and defining thus calculated center position as a measured center position; and outputting relative distance information between the measured center position and a position corresponding to a rotational center position of the curved leading end face of the ferrule or the relative distance information and relative directional information thereof as an inclination error adjustment value for the axis of the ferrule.

This method may comprise the steps of:

causing the interferometer apparatus to obtain respective interference fringe images of the curved leading end face of the ferrule at three rotational positions by rotating the ferrule by a predetermined angle with respect to the clamping apparatus while in a state where the ferrule is held by the clamping apparatus;

determining respective interference fringe center positions in thus obtained three interference fringe images; and determining a center position of a circle circumscribing a triangle whose vertices are located at thus determined three interference fringe center positions and defining thus determined center position as the measured center position.

Also, the method may comprise the steps of:

causing the interferometer apparatus to obtain respective interference fringe images of the curved leading end face of the ferrule at four or more rotational positions by rotating the ferrule by a predetermined angle with respect to the clamping apparatus while in a state where the ferrule is held by the clamping apparatus;

determining respective interference fringe center positions in thus obtained four or more interference fringe images;

choosing at least two interference fringe center position groups each composed of three interference fringe center positions from thus determined four or more interference fringe center positions, and determining respective center positions of circles circumscribing triangles whose vertices are located at the three interference fringe center positions in the interference fringe center position groups corresponding thereto; and obtaining an average value of thus determined plurality of center positions and defining thus obtained average value as the measured center position.

According to the inclination error adjustment value of the axis of the ferrule, the relative distance information between the measured center position and a position corresponding to the rotational center position of the curved leading end face of the ferrule or the relative distance information and relative directional information thereof may be displayed on a monitor, so as to facilitate the inclination error adjustment for the axis of the ferrule.

The interferometer apparatus may be of Mireau type.

DESCRIPTION OF THE PREFERRED EMBODIMENTS

In the following, an embodiment of the present invention will be explained with reference to the drawings. Before explaining the method of assisting sample inclination error adjustment in accordance with the present invention, a microscopic interferometer apparatus, equipped with a clamping apparatus for holding a ferrule as a sample, for observing a spherical leading end part of the ferrule by using a predetermined interference optical system will be explained with reference to FIG. 11.

Microscopic Interferometer Apparatus

Figure 11:
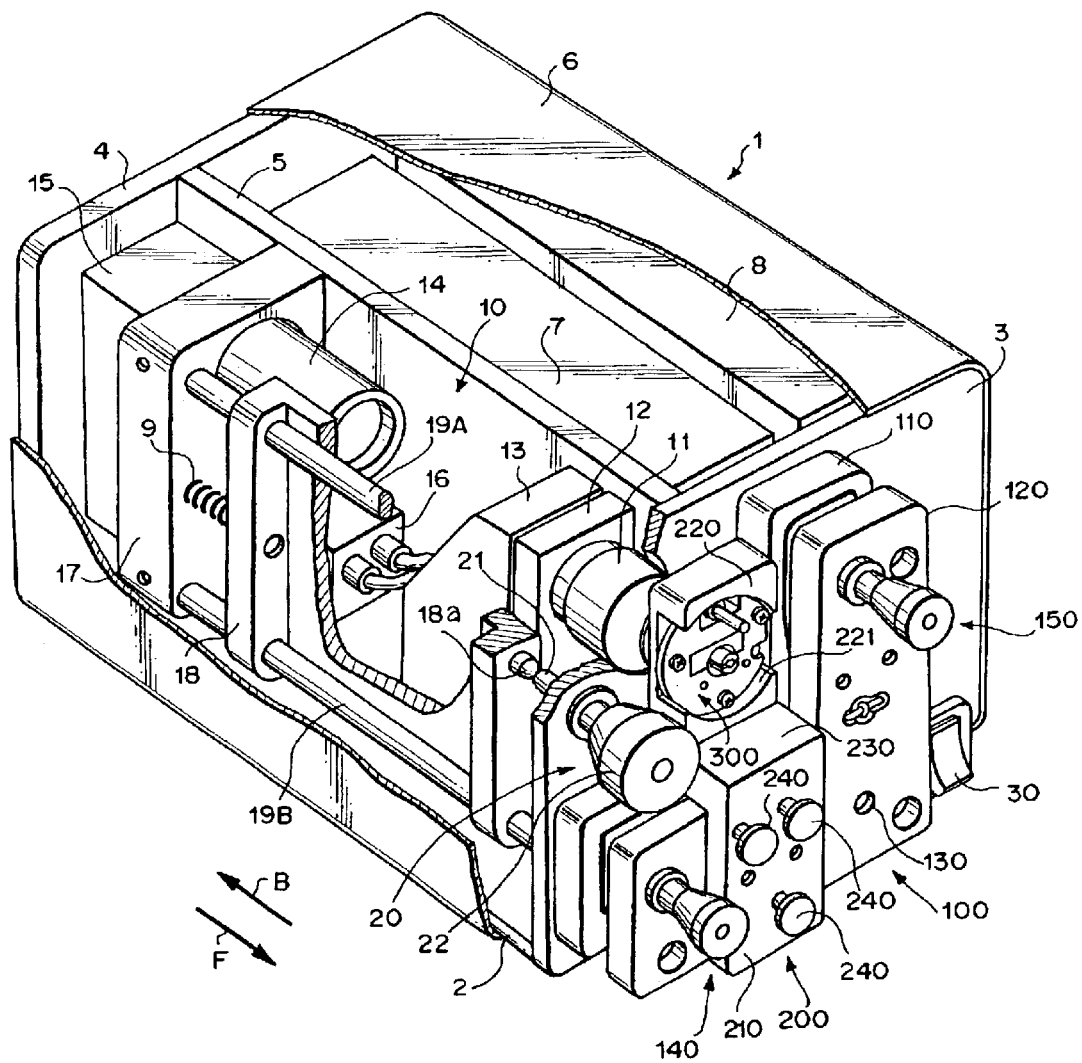
FIG. 11 is a perspective view of a microscopic interferometer apparatus equipped with the clamping apparatus shown in FIG. 7.

FIG. 11 is a partly cutaway perspective view showing a microscopic interferometer apparatus.

The microscopic interferometer apparatus 1 shown in FIG. 11 comprises a main housing constituted by a bottom plate 2, a front plate 3 (depicted in a partly cutaway fashion), a rear plate 4, a partition 5, and a cover case 6 (depicted in a partly cutaway fashion), whereas a power supply 7, a control box 8, and a main system 10 are disposed within the main housing.

The main system 10 comprises an objective lens unit 11, a piezoelectric unit 12, a half mirror/light source unit 13, an imaging lens unit 14, a mirror box 15, and a CCD camera unit 16. Among them, the imaging lens unit 14, mirror box 15, and CCD camera unit 16 are attached to a stationary table 17 secured to the partition 5, whereas the objective lens unit 11, piezoelectric unit 12, and half mirror/light source unit 13 are attached to a focus table 18 (depicted in a partly cutaway fashion).

The focus table 18 is supported by upper and lower guide shafts 19A, 19B (depicted in a partly cutaway fashion) extending in parallel in back and forth directions (indicated by arrows B and F in the drawing), so as to be slidable back and forth. A coil spring 9 is disposed between the stationary table 17 and the focus table 18, so that the focus table 18 is urged forward (in the direction of arrow F in the drawing) by the elasticity of the coil spring 9.

The front plate 3 is provided with a focus adjustment screw 20 for moving the focus table 18 so as to carry out focus adjustment of the main system 10. This focus adjustment screw 20 comprises a screw shaft 21 threaded into an undepicted screw hole formed in the front plate 3 so as to be movable back and forth when rotating about its axis, and a knob 22 for rotating the screw shaft 21. The leading end face of the screw shaft 21 abuts against a semispherical protrusion 18a disposed at the front face part of the focus table 18. As the length of screw shaft 21 projected from the front plate 3 is changed by rotating the knob 22, the focus adjustment screw 20 can move the focus table 18 back and forth along the guide axes 19A, 19B, thus enabling focus adjustment.

The interferometer main system 10 having the above-mentioned configuration irradiates a minute sample (not depicted) held at a predetermined position in front of the objective lens unit 11 with illumination light from an undepicted light source separated from reference light, causes the object light reflected from the sample to interfere with the reference light, passes thus generated interference light through an imaging lens system (not depicted) within the imaging lens unit 14, and then forms an image of interference fringes onto an undepicted CCD. When forms and changes of thus obtained interference fringes are measured and analyzed, the three-dimensional measurement of the surface form of the sample and the physical property measurement thereof can be carried out. Employable as the interferometer main system 10 are various types such as those of Mireau, Michelson, and Linnik.

The front plate 3 is provided with an inclination adjuster 100. The inclination adjuster 100 comprises an L-shaped first base member 110 secured to the front plate 3, and a second base member 120 having an L-shape similar to the first base member 110 and opposing the first base member 110. The second base member 120 is supported so as to be inclinable with respect to the first base member 110 about a fulcrum part 130, while being tilted about an axis substantially perpendicularly extending from the fulcrum part 130 and an axis substantially horizontally extending from the fulcrum part 130 by a first inclination adjusting screw 140 and a second inclination adjusting screw 150, whereby its inclination with respect to the first base member 110 can be adjusted.

A clamping apparatus holder 200 is attached to the second base member 120 of the inclination adjuster 100. The clamping apparatus holder 200 comprises an upper part 210, a lower part 220, and a connecting part 230 connecting them, whereas the lower part 220 is fastened by three attachment screws 240. The upper part 210 of the clamping apparatus holder 200 is positioned on the front face side of the objective lens unit 11, whereas its center part is formed with a holder depression 211 for holding a clamping apparatus 300 therein. The front plate 3 is further provided with a power switch 30 for turning ON/OFF the power of the microscopic interferometer apparatus 1.

Configuration of Clamping Apparatus

Figure 7:
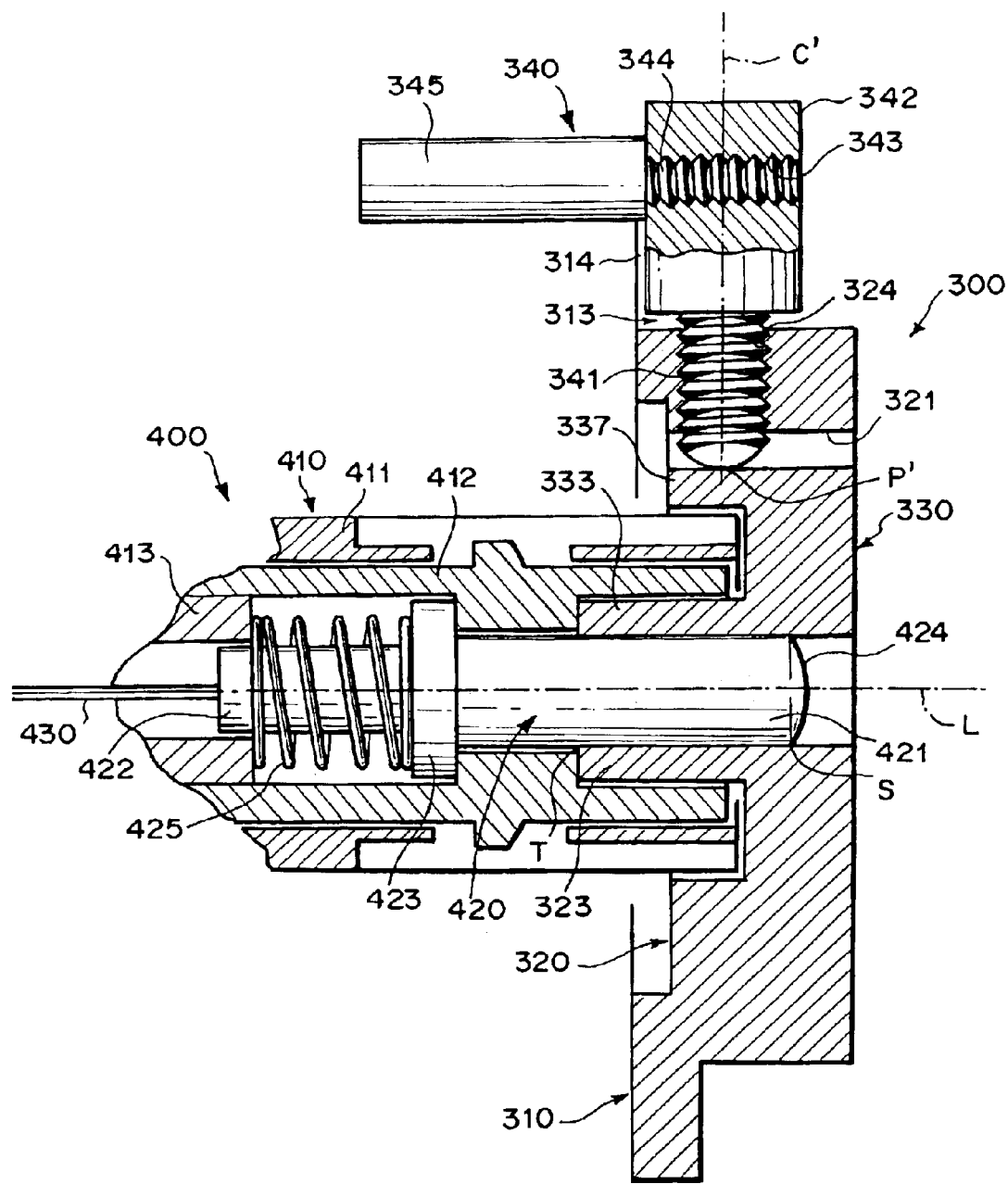
FIG. 7 is a sectional view of a clamping apparatus for a ferrule in accordance with the above-mentioned embodiment.
Figure 8:
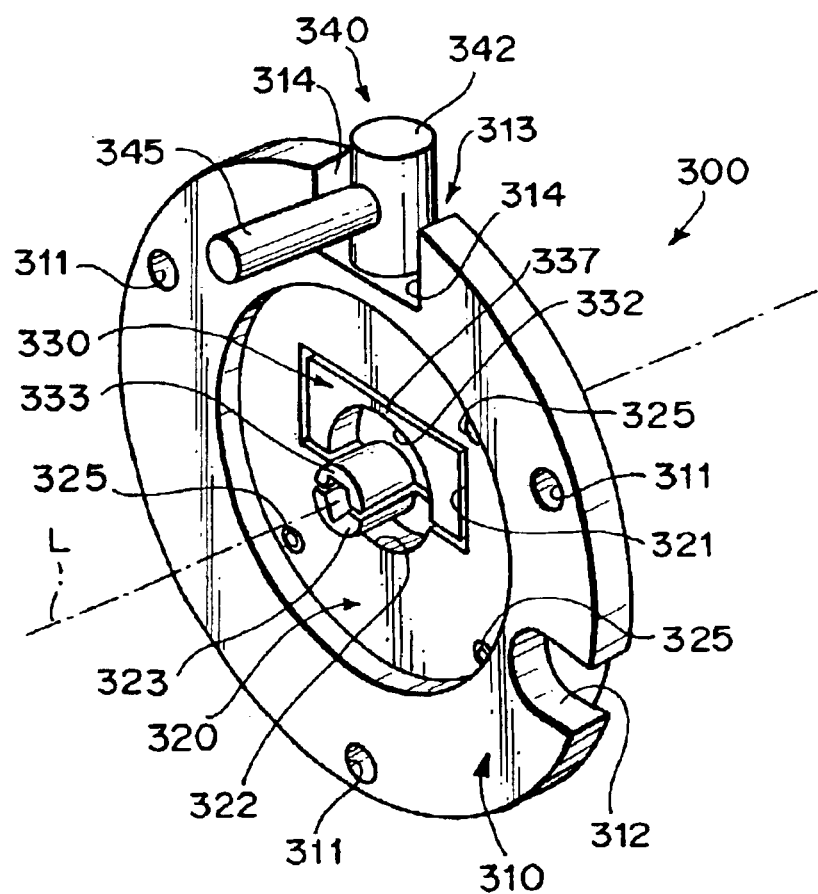
FIG. 8 is a perspective view showing the exterior of the clamping apparatus shown in FIG. 7.
Figure 9:
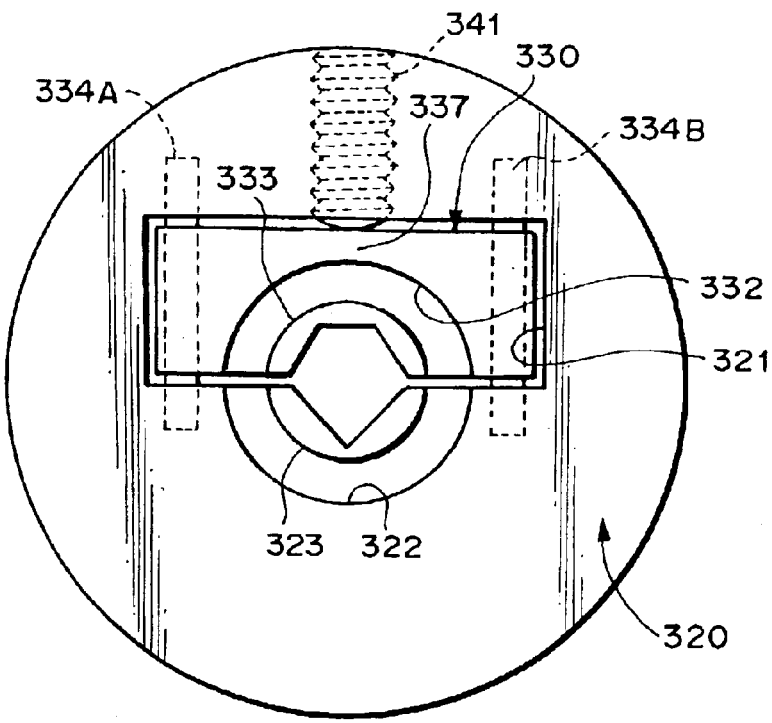
FIG. 9 is a partial front view of the clamping apparatus shown in FIG. 7.
Figure 10:
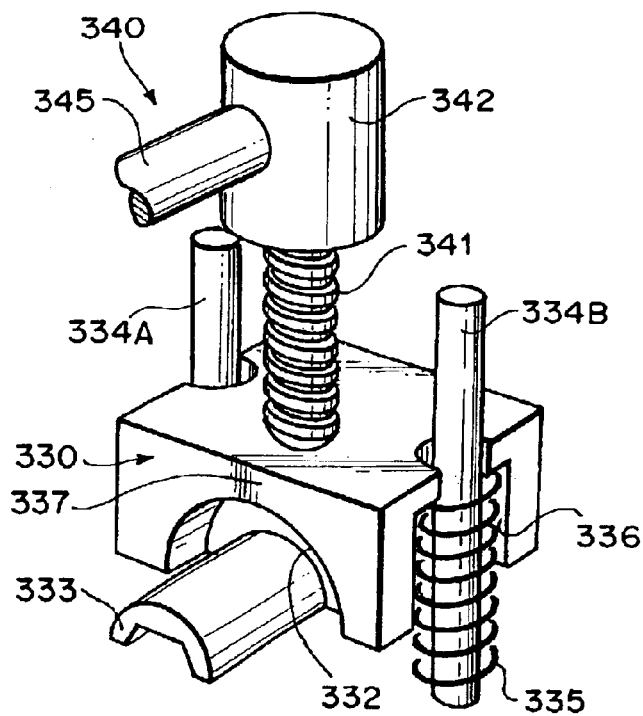
FIG. 10 is a perspective view showing a part of the clamping apparatus shown in FIG. 7.

The clamping apparatus 300 will now be explained in detail with reference to FIGS. 7 to 10. FIG. 7 is a sectional view of the ferrule clamping apparatus in accordance with an embodiment of the present invention, FIG. 8 is a perspective view thereof, FIG. 9 is a partial front view thereof, and FIG. 10 is a perspective view showing a part taken out therefrom. Here, FIG. 7 shows a state holding a ferrule.

The depicted clamping apparatus 300 is used for holding a ferrule 420 accommodated within a tubular member 410 shown in FIG. 7 at a predetermined position in front of the objective lens unit 11 in the microscopic interferometer apparatus 1 shown in FIG. 11.

The tubular member 410 constitutes an optical connector plug 400 (which may also be simply referred to as "plug 400" hereinafter) to be connected to another plug (not depicted) by way of a sleeve (not depicted), and comprises an inner tube 412 and an outer tube 411 disposed so as to be slidable back and forth with respect to the inner tube 412, whereas the ferrule 420 is accommodated therein.

The ferrule 420 holds one end part of a single-mode type optical fiber 430 at the outer diameter center of a main part 421, whereas a holder constituted by a cylindrical part 422 and a brim 423 is attached to the rear end part of the main part 421. The ferrule main part 421 is made of zirconia ceramics, whereas its leading end face 424 is PC-polished into a convex spherical form.

The ferrule 420 is accommodated within the tubular member 410 while in a state where a coil spring 425 is attached to the cylindrical part 422, whereas a spring stopper ring 413 restrains it from dropping out rearward. The elasticity of the coil spring 425 urges the ferrule 420 forward with a constant pressure, thereby making it easier for the leading end face 424 to come into close contact with the leading end face of another ferrule which is not depicted.

As shown in FIGS. 7 and 8, the clamping apparatus 300 comprises a base 310 having a substantially annular form, a support part 320 formed like a disk thicker than the base 310, a shifter 330 disposed so as to be movable up and down with respect to the support part 320, and a pressing member 340 for pressing the shifter 330 from the upper side thereof.

As shown in FIG. 8, the base 310 comprises three screw holes 310 and a positioning cutout 312. The screw holes 311 are adapted to receive screws for attaching the clamping apparatus 300 to the clamping apparatus holder 200 (see FIG. 11). The cutout 312 is provided such that the clamping apparatus 300 can be positioned with respect to the clamping apparatus holder 200 when the clamping apparatus 300 is set such that a positioning pin (not depicted) provided with the clamping apparatus holder 200 is inserted into the cutout 312. The top part of the base 310 is formed with a depression 313.

The support part 320 is integrally formed with the base 310, whereas a rectangular window 321 is formed at a position shifted slightly upward from the center part thereof. The front face of the support part 320 is formed with a semicircular depression 322 adjoining the lower side of the window 321, whereas a first support piece 323 extending forward along the axis L of the clamping apparatus 300 is disposed within the depression 322. As shown in FIG. 8, the outer periphery of the first support piece 323 is formed into a semicylindrical surface, whereas its inner periphery is formed into a groove having a V-shaped cross section. The cross section of the first support piece 323 shown in FIG. 7 is illustrated so as to extend along the position at which the first support piece 323 and the ferrule 420 are in contact with each other.

The shifter 330 is formed separately from the base 310, and is disposed within the window 321 of the support part 320. The front face of the shifter 330 is formed with a semicircular depression 332 formed symmetrical to the depression 322 of the support part 320, whereas a second support piece 333 extending forward while opposing the first support piece 323 across the axis L of the clamping apparatus 300 is disposed within the depression 332. As shown in FIG. 8, the outer periphery of the second support piece 333 is formed into a semicylindrical surface, whereas its inner periphery is formed into a groove having a trapezoidal cross section.

As shown in detail in FIG. 9, the shifter 330 is movable up and down along guide shafts 334A, 334B vertically extending at respective end parts on the left and right sides within the window 321 of the support part 320. As shown in FIG. 10, respective coil springs 335 (only the one on the guide shaft 334B side being depicted) for urging the shifter 330 upward are attached to the two guide shafts 334A, 334B, whereas the shifter 330 is formed with spring-receiving depressions 336 for holding the respective upper end parts of the coil springs 335. When the shifter 330 is not pressed by the pressing member 340, the elasticity of the coil springs 335 positions the second support piece 333 of the shifter 330 at a clamping release position separated from one side face of the ferrule 420 in a state supported by the first support piece 323 of the support part 320 by the other side face side. The coil springs 335 may be disposed at positions different from the guide shafts 334A, 334B. Other elastic members such as rubber can also be used as means for urging the shifter 330 upward.

As shown in FIG. 7, the pressing member 340 comprises a screw shaft 341 threaded into a screw hole 324 extending from the bottom face of the depression 313 formed at the top part of the base 310 to the window 321 formed in the support part 320, a screw base 342 having a diameter greater than that of the screw shaft 341, and a lever member 345 having a screw shaft 344 threaded into a screw hole 343 formed in the screw base 342. When the lever member 345 is rotated about the axis C' of the screw shaft 341, the pressing member 340 presses the shifter 330 downward while in a state where the spherical leading end face of the screw shaft 341 is in contact with the shifter 330, thus allowing the second support piece 333 to shift against the coil springs 335 from the clamping release position to a clamping position in contact with the above-mentioned one side face of the ferrule 420.

As shown in FIG. 7, the shifter 330 is provided with a pressure-bearing piece 337 opposing the second support piece 333 across one side wall part of the tubular member 410 in a state held by the clamping apparatus 300. The pressing member 340 is arranged such that the line of action of a force (coinciding with the axis C') passing its pressing point P' (the intersection between the spherical leading end face of the screw shaft 341 and the pressure-bearing piece 337) passes through the tubular member 410, intersects the pressure-bearing piece 337, and passes through the area (area between points S and T in FIG. 7) of ferrule 420 supported by the first support piece 323. As shown in FIG. 8, the rotating area of the lever member 345 of the pressing member 340 is restricted by a stopper 314 constituted by left and right wall parts of the depression 313 formed in the top part of the base 310 of the clamping apparatus 300.

Operation of Clamping Apparatus

The clamping apparatus 300 constructed as mentioned above holds the optical connector plug 400 as follows. First, the plug 400 is pressed against the front face of the clamping apparatus 300 such that the leading end part of the ferrule 420 is inserted between the first support piece 323 of the support part 320 of the clamping apparatus 300 and the second support piece 333 of the shifter 330. Then, the lever member 345 of the pressing member 340 is rotated, so that the leading end face of the screw shaft 341 of the pressing member 340 presses the pressure-bearing piece 337 of the shifter 330, thus shifting the second support piece 333 of the shifter 330 from the clamping release position to the clamping position, whereby the leading end part of the ferrule 420 is held between the first support piece 323 and the second support piece 333. As a consequence, the plug 400 is held by the clamping apparatus 300 while in a state where the axis (not depicted) of the ferrule 420 coincides with the axis L of the clamping apparatus 300.

In this holding state, the first support piece 323 and second support piece 333 of the clamping apparatus 300 extend from the outer side to inner side of the leading end of the tubular member 410 while opposing each other. Therefore, the chucking margin for the ferrule 420 formed by the first and second support pieces 323, 333 can be made long. The spherical leading end face of the screw shaft 341 of the pressing member 340 presses the pressure-bearing piece 337 of shifter 330 extending over the second support piece 333 (in an overhanging fashion). As a consequence, the line of action of the force of the pressing member 340 passes through the tubular member 410 so as to intersect the pressure-bearing piece 337, and further passes through the area of ferrule 420 supported by the first support piece 323. Therefore, the shifter 330 pressed by the pressure member 340 is prevented from twisting (rotating the shifter 330 clockwise in FIG. 7 when the line of action of the force passes outside of the area of ferrule 420 supported by the first support piece 323), whereby the ferrule 420 can be held reliably.

For removing the plug 400 from the clamping apparatus 300, it will be sufficient if the lever member 345 of the pressing member 340 is rotated in the opposite direction so as to stop the leading end face of the screw shaft 341 pressing the shifter 330, thereby moving the second support piece 333 of the shifter 330 to the clamping release position, so that the first support piece 323 and second support piece 333 stop holding the ferrule 420, thus releasing the ferrule 420.

Method of Assisting Sample Inclination Error Adjustment

While the ferrule 420 is reliably held by the clamping apparatus 300 as mentioned above, the specs for the ferrule leading end face form are in the order of $\mu$m as mentioned above, so that the measurement thereof is required to be highly accurate, whereby a measurement accuracy suitable for the inspection is hard to attain even when the ferrule held by the clamping apparatus inclines slightly.

Such an apparatus has various mechanical components (such as the inclination adjusting apparatus 100 and the clamping apparatus holder 200), so that their mechanical tolerances are prone to accumulate, whereby the ferrule inclines by a minute angle in response thereto. When inspecting the above-mentioned positional deviation errors between the apex of the spherical leading end face of the ferrule and the center of the core of the optical fiber (substantially coinciding with the center of the fiber outer form) in particular, a measurement accuracy suitable for the inspection is hard to attain unless the inclination error between the normal of the reference surface of the microscopic interferometer apparatus 1 and the ferrule axis is an angle of 10 seconds or less.

Therefore, the inclination error is to be adjusted. Since its accuracy is required to be very high, the following technique is used for assisting the adjustment in the method of this embodiment.

Figure 2:
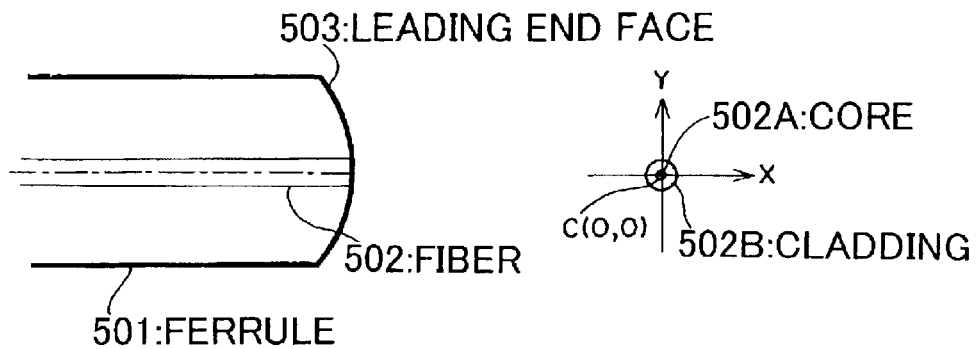
FIG. 2 is a view for explaining the method of assisting sample inclination error adjustment in accordance with the above-mentioned embodiment of the present invention.

A case where the leading end face form of the ferrule is observed by the microscopic interferometer apparatus 1 will be considered here. As shown in FIG. 2, a fiber 502 is set such that, when it is disposed so as to align with the outer form center axis (dash-single-dot line) of a ferrule 501, a core 502A is superposed on point C (0, 0) of xy coordinates on projection plane coordinates of a leading end face 503 of the ferrule 501. On the projection plane coordinates, a cladding 502B positioned near the core 502A will be omitted hereinafter. In the case where the leading end face 503 has no apical eccentricity (the apex does not deviate from the center) while the center axis of the ferrule 501 is disposed perpendicular to the reference surface of the microscopic interferometer apparatus 1, interference fringes of the leading end face 503 appear while being centered at point C (0, 0) on the projection plane coordinates.

Figure 3:
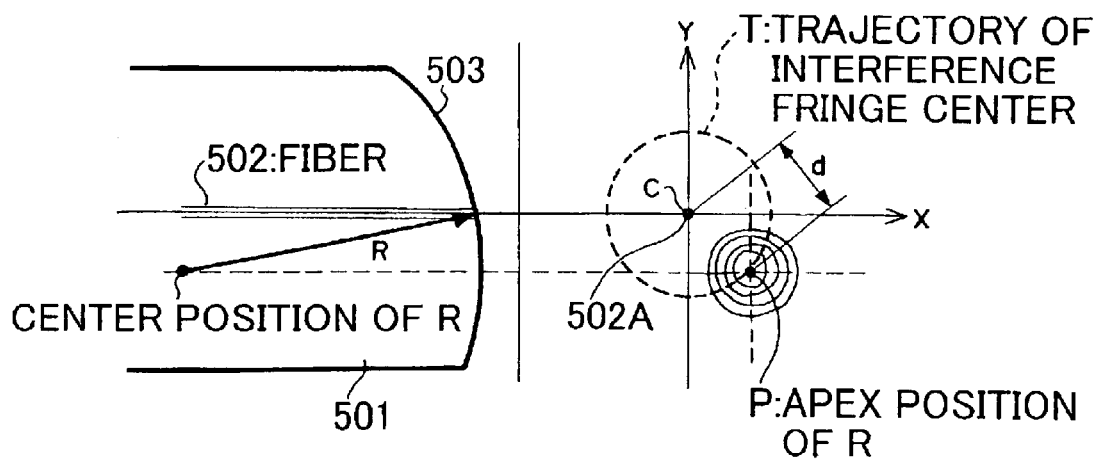
FIG. 3 is a view for explaining the method of assisting sample inclination error adjustment in accordance with the above-mentioned embodiment of the present invention (in a case with apical eccentricity without inclination)

However, an apical eccentricity exists in the leading end face 503 of such a ferrule 501 in general, so that the leading end face 503 attains an eccentric form such as the one shown in FIG. 3, for example. When the leading end face has such a form, the center position of interference fringes of the leading end face 503 is located at a position P corresponding to the apex position of the leading end face 503 on the projection plane coordinates. When the ferrule 501 is rotated about its center axis (S-S') in the case where the center axis of the ferrule 501 is disposed perpendicular to the reference surface of the microscopic interferometer apparatus 1, the trajectory T of the center of interference fringes becomes a circle having a diameter d about the point C (0, 0).

Figure 4:
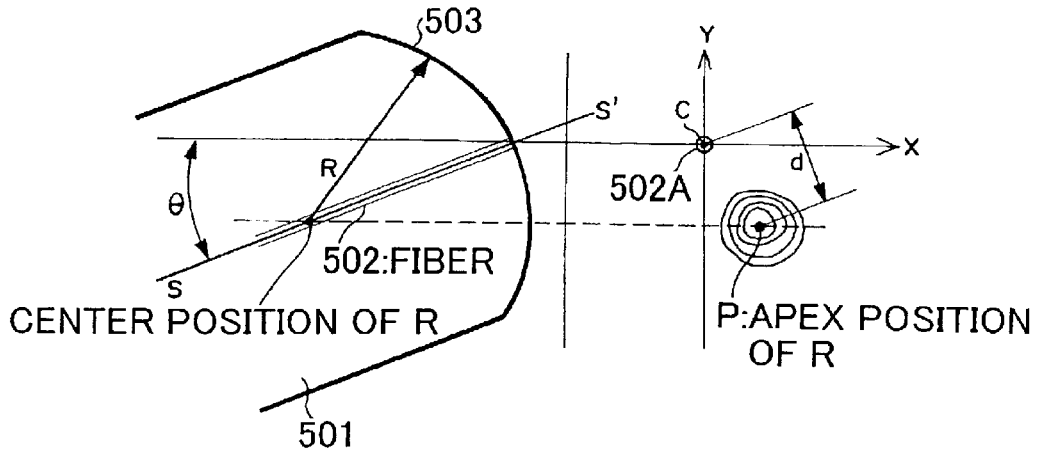
FIG. 4 is a view for explaining the method of assisting sample inclination error adjustment in accordance with the above-mentioned embodiment of the present invention (in a case with inclination without apical eccentricity)

A case where the center axis of such a ferrule 501 is inclined with respect to an axis perpendicular to the reference surface of the microscopic interferometer apparatus 1 will now be considered. First, as shown in FIG. 4, the form of the leading end face 503 is supposed to have no apical eccentricity. Here, the center of interference fringes of the leading end face 503 is located at the position P corresponding to the apex position of the leading end face 503 on the projection plane coordinates. When the ferrule 501 is rotated about its center axis (S-S'), the trajectory T of the center of interference fringes becomes a circle having a diameter d about the point C (0, 0) as in the case of FIG. 3.

Figure 5:
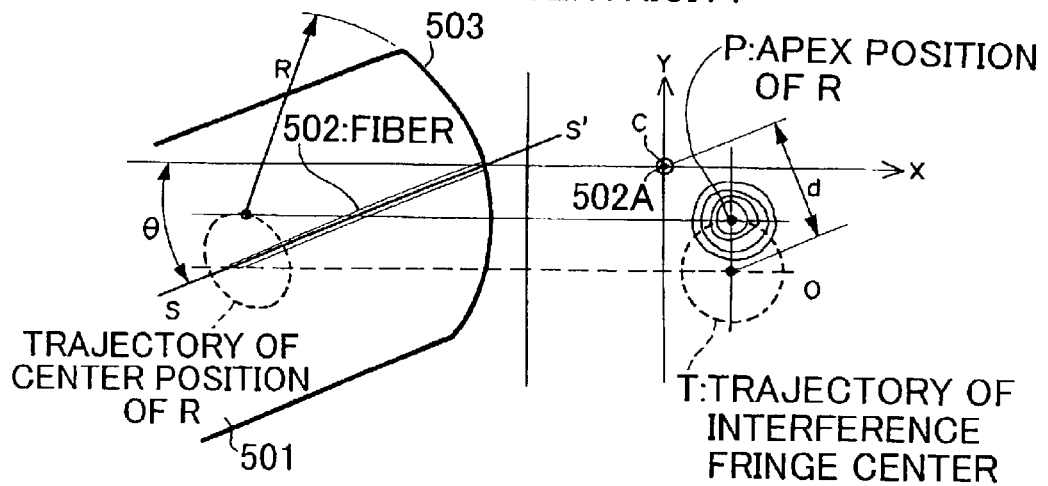
FIG. 5 is a view for explaining the method of assisting sample inclination error adjustment in accordance with the above-mentioned embodiment of the present invention (in a case with inclination and apical eccentricity)
Figure 6:
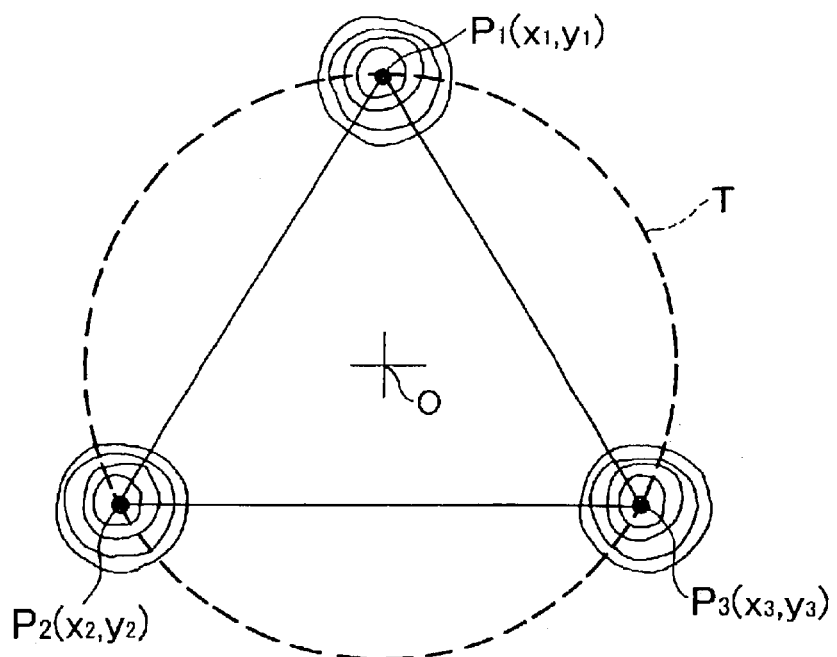
FIG. 6 is a view for explaining the method of assisting sample inclination error adjustment in accordance with the above-mentioned embodiment of the present invention (a technique for determining the center position of a trajectory of the center of interference fringes)

When the ferrule 501 is inclined while the form of its leading end face 503 has an apex eccentricity, as shown in FIG. 5, the center of interference fringes of the leading end face 503 is located at the position P corresponding to the apex position of the leading end face 503 on the projection plane coordinates, and does not move even when the ferrule 501 is rotated about its center axis (S-S'), whereby its trajectory T becomes a point.

Figure 1:
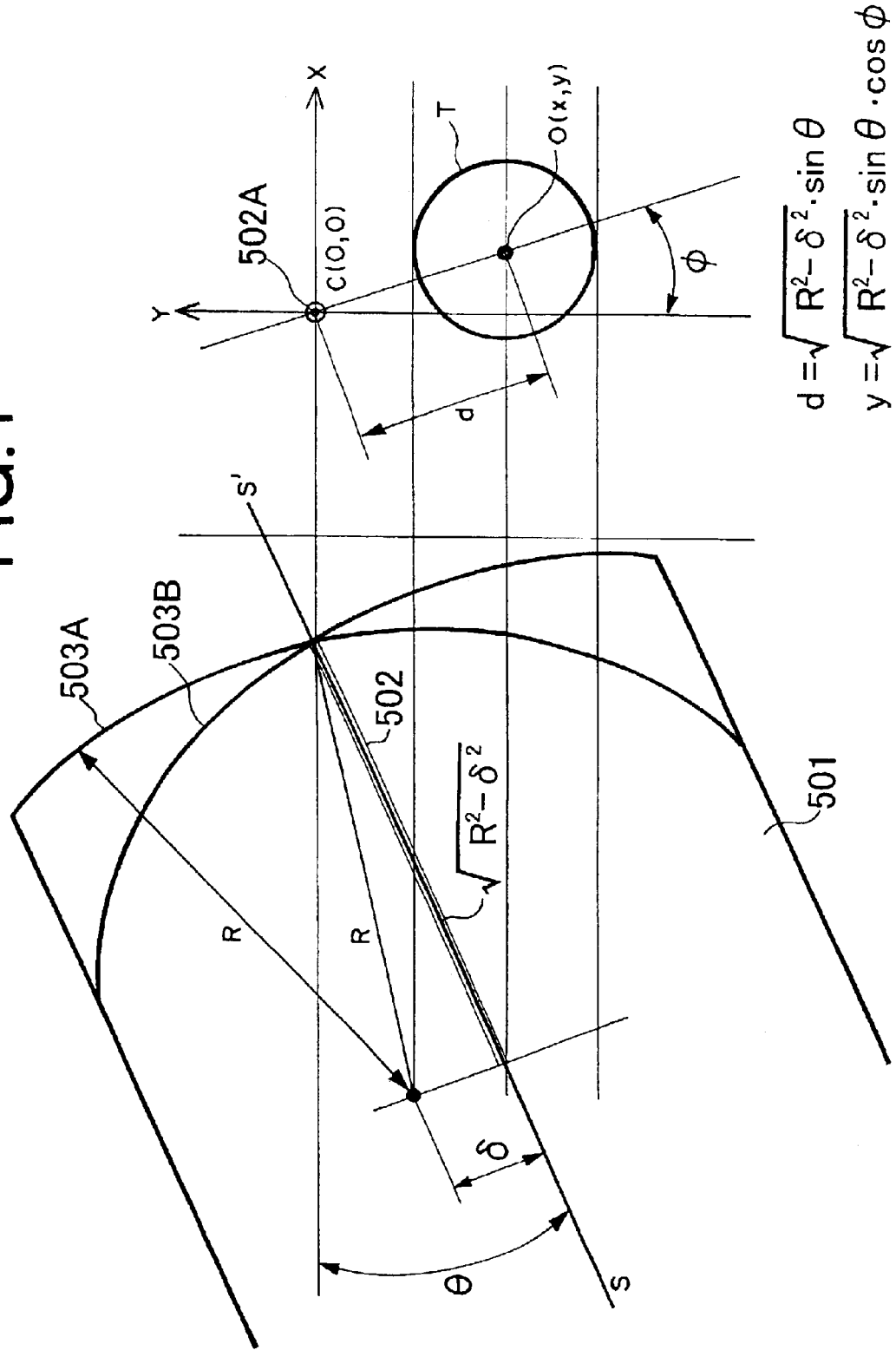
FIG. 1 is a diagram for explaining the method of assisting sample inclination error adjustment in accordance with an embodiment of the present invention.

FIG. 1 illustrates this fact in detail, while showing leading end faces 503A, 503B obtained when the ferrule 501 is rotated about its center axis (S-S') by 180° in respective directions opposite from each other, respectively. In this case, the distance d between O (x, y) acting as the center (circle center) of the trajectory T of the center of interference fringes and the point C (0, 0) is expressed by $d=(R^2-\delta^2)^{1/2} \times \sin\theta$. Here, R is the radius of curvature of the leading end face, $\delta$ is the distance between the radius center of the leading end face and the center axis of the ferrule 501, $\theta$ is the inclination of the ferrule, and $\phi$ is the inclination of the line connecting O (x, y) and the point C (0, 0) with respect to Y axis.

For determining O (x, y) acting as the center (circle center), interference fringes are measured each time when the ferrule 501 is rotated about its center axis (S-S') in general (at intervals of 120°, for example), so as to obtain respective interference fringes at three rotational positions, whereas respective rotational centers $P_1$, $P_2$, $P_3$ of the interference fringes are determined on the projection plane coordinates, and a circle circumscribing a triangle whose vertices are located at the three points $P_1$, $P_2$, $P_3$ is defined as a trajectory T of the center of interference fringes. Though the actual trajectory T of the center of interference fringes is not strictly a perfect circle since the ferrule 501 is slightly inclined, it may be approximated by a circle if the inclination is 1° or less (it usually falls within this range), because cos1°=0.99985.

Thus, assuming the circle circumscribing the above-mentioned triangle to be the trajectory T of the center of interference fringes, the coordinates X, Y of its center (circle center) can be determined by the following calculations.

Since the circle is expressed by the equation $$(x-X)^2+(y-Y)^2=r^2,$$

the following conditional expressions (1), (2), (3) are obtained when coordinates $(x_1, y_1)$ of the point $P_1$, coordinates $(x_2, y_2)$ of the point $P_2$, and coordinates $(x_3, y_3)$ of the point $P_3$ are inputted to variables x, y of the above-mentioned equation:

$$x_1^2-2x_1X+X^2+y_1^2-2y_1Y+Y^2=r^2 \quad (1)$$

$$x_2^2-2x_2X+X^2+y_2^2-2y_2Y+Y^2=r^2 \quad (2)$$

$$x_3^2-2x_3X+X^2+y_3^2-2y_3Y+Y^2=r^2 \quad (3)$$

When conditional expression (2) is subtracted from conditional expression (1), the following conditional expression (4) is obtained:

$$x_1^2-x_2^2-2(x_1-x_2)X+y_1^2-y_2^2-2(y_1-y_2)Y=0 \quad (4)$$

When conditional expression (3) is subtracted from conditional expression (1), the following conditional expression (5) is obtained:

$$x_1^2-x_3^2-2(x_1-x_3)X+y_1^2-y_3^2-2(y_1-y_3)Y=0 \quad (5)$$

Next, conditional expression (4)×($y_1-y_3$) is defined as conditional expression (6) whereas conditional expression (5)×($Y_1-Y_2$) is defined as conditional expression (7):

$$(x_1^2-x_2^2+y_1^2-y_2^2)(y_1-y_3)-2(x_1-x_2)(y_1-y_3)X-2(y_1-y_2)(y_1-y_3)Y=0 \quad (6)$$

$$(x_1^2-x_3^2+y_1^2-y_3^2)(y_1-y_2)-2(x_1-x_3)(y_1-y_2)X-2(y_1-y_3)(y_1-y_2)Y=0 \quad (7)$$

Therefore, subtracting conditional expression (7) from conditional expression (6) yields X as follows:

$$X = \frac{(x_1^2-x_2^2+y_1^2-y_2^2)(y_1-y_3)-(x_1^2-x_3^2+y_1^2-y_3^2)(y_1-y_3)}{2(x_1-x_2)(y_1-y_3)-2(x_1-x_3)(y_1-y_2)}$$

Similarly, Y is obtained as follows:

$$Y = \frac{(x_1^2-x_2^2+y_1^2-y_2^2)(x_1-x_3)-(x_1^2-x_3^2+y_1^2-y_3^2)(x_1-x_3)}{2(y_1-y_2)(x_1-x_3)-2(y_1-y_3)(x_1-x_2)}$$

As such, according to the coordinates X, Y of the center (circle center) of the trajectory T of the center of determined interference fringes, the distance d from the center position O of the trajectory T of the center of interference fringes to the point C (0, 0) and its direction can be seen, whereby the inclination error of the ferrule 501 can be adjusted.

Displaying the distance d and its direction on a monitor is favorable in that it becomes easier to adjust the inclination error.

The inclination error adjustment may be carried out manually, or automatically according to an output value corresponding to the distance d and its direction.

Further, the distance and a value corresponding to the method can be used as a correction value for correcting the measurement data, so as to adjust the inclination error.

Without being restricted to the above-mentioned embodiment, the method of assisting sample inclination error adjustment in accordance with the present invention can be modified in various manners. For example, though respective interference fringe images of the spherical leading end part of the ferrule are obtained at three rotational positions in the above-mentioned embodiment, the method may comprise the steps of obtaining respective interference fringe images of the spherical leading end part of the ferrule at four or more rotational positions, determining respective interference fringe center positions in thus obtained four or more interference fringe images, choosing at least two interference fringe center position groups each composed of three interference fringe center positions from thus determined four or more interference fringe center positions, determining respective center positions of circles circumscribing triangles whose vertices are located at the three interference fringe center positions in the interference fringe center position groups corresponding thereto, obtaining an average value of thus determined plurality of center positions, and defining thus obtained average value as the center position of the trajectory T of the center of interference fringes.

According to determined three or more interference fringe center positions, the method of least squares may be used for determining the trajectory T of the center of interference fringes and its center position.

As explained in detail in the foregoing, the method of assisting sample inclination error adjustment in accordance with the present invention rotates a ferrule by a predetermined angle with respect to its clamping apparatus, causes a microscopic interferometer apparatus to obtain respective interference fringe images of a spherical leading end part of the ferrule at three or more rotational positions, determining respective interference fringe center positions in thus obtained three or more interference fringe images, calculates a center position of a circle passing near each of the interference fringe center positions according to thus determined interference fringe center positions, defines thus calculated center position as a measured center position, and outputs relative distance information between the measured center position and a position corresponding to the rotational center position of the spherical leading end part of the ferrule or the relative distance information and relative directional information thereof as an inclination error adjustment value for the axis of the ferrule.

Therefore, the inclination error of the ferrule axis can be recognized with a high accuracy by using an apparatus for carrying out measurement.

As a consequence, the inclination error of the axis of the ferrule held by the clamping apparatus can be adjusted easily at a low cost.

What is claimed is:

1. A method of assisting sample inclination error adjustment for assisting inclination error adjustment of an axis of a ferrule when a curved leading end face of said ferrule as a sample held by a clamping apparatus is observed by an interferometer apparatus, said method comprising the steps of:

causing said interferometer apparatus to obtain respective interference fringe images of said curved leading end face of said ferrule at three or more rotational positions by rotating said ferrule by a predetermined angle with respect to said clamping apparatus while in a state where said ferrule is held by said clamping apparatus;

determining respective interference fringe center positions in thus obtained at least three interference fringe images;

calculating a center position of a circle passing near each of thus determined interference fringe center positions and defining thus calculated center position as a measured center position; and outputting relative distance information between said measured center position and a position corresponding to a rotational center position of said curved leading end face of said ferrule or said relative distance information and relative directional information thereof as an inclination error adjustment value for said axis of said ferrule.

2. A method of assisting sample inclination error adjustment according to claim 1, said method comprising the steps of:

causing said interferometer apparatus to obtain respective interference fringe images of said curved leading end face of said ferrule at three rotational positions by rotating said ferrule by a predetermined angle with respect to said clamping apparatus while in a state where said ferrule is held by said clamping apparatus;

determining respective interference fringe center positions in thus obtained three interference fringe images; and determining a center position of a circle circumscribing a triangle whose vertices are located at thus determined three interference fringe center positions and defining thus determined center position as said measured center position.

3. A method of assisting sample inclination error adjustment according to claim 1, said method comprising the steps of:

causing said interferometer apparatus to obtain respective interference fringe images of said curved leading end face of said ferrule at four or more rotational positions by rotating said ferrule by a predetermined angle with respect to said clamping apparatus while in a state where said ferrule is held by said clamping apparatus;

determining respective interference fringe center positions in thus obtained four or more interference fringe images;

choosing at least two interference fringe center position groups each composed of three interference fringe center positions from thus determined four or more interference fringe center positions, and determining respective center positions of circles circumscribing triangles whose vertices are located at said three interference fringe center positions in said interference fringe center position groups corresponding thereto; and obtaining an average value of thus determined plurality of center positions and defining thus obtained average value as said measured center position.

4. A method of assisting sample inclination error adjustment according to claim 1, wherein, according to said inclination error adjustment value of said axis of said ferrule, said relative distance information between said measured center position and a position corresponding to said rotational center position of said curved leading end face of said ferrule, or said relative distance information and relative directional information thereof are displayed on a monitor.

5. A method of assisting sample inclination error adjustment according to claim 1, wherein said interferometer apparatus is microscopic interferometer apparatus.

6. A method of assisting sample inclination error adjustment according to claim 5, wherein said microscopic interferometer apparatus is of Mireau type.

* * * * *